Figure 1:
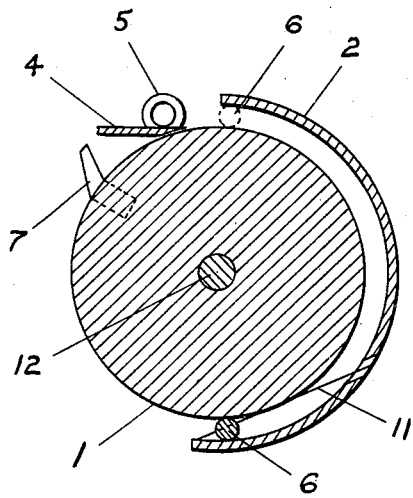

April 18, 1939.                    A. H. HAUPT                    2,154,446
          METHOD AND APPARATUS FOR FORMING PLASTIC MATERIALS INTO
             CYLINDERS OF PREDETERMINED LENGTH AND DIAMETER
                            Filed Aug. 5, 1935

INVENTOR,
Albertus Hendrik Haupt.

BY

ATTORNEY

Patented Apr. 18, 1939

2,154,446

UNITED STATES PATENT OFFICE 2,154,446

METHOD AND APPARATUS FOR FORMING PLASTIC MATERIALS INTO CYLINDERS OF PREDETERMINED LENGTH AND DIAMETER

Albertus Hendrik Haupt, Somerset West, Cape Province, Union of South Africa, assignor to Imperial Chemical Industries Limited, a corporation of Great Britain Application August 5, 1935, Serial No. 34,822
In Great Britain October 26, 1934

8 Claims. (Cl. 18—5)

This invention relates to an improved method and apparatus for cutting plastic or gelatinous material, especially plastic or gelatinous blasting explosives, into cylinders of predetermined length and diameter.

In United States application Serial No. 738,887, which has now resulted in U. S. Patent 2,082,833, dated June 8, 1937, there is described and claimed a method of cutting extruded plastic material, especially gelatinous or plastic explosives, into pieces of predetermined length, irrespective of variations in the rate of extrusion, which comprises extruding a length of the plastic material which is slightly greater than the desired length and shearing the extruded piece of material simultaneously in two places which are separated from one another by the desired length.

An object of the present invention is to provide a method and apparatus whereby plastic material extruded from an extruding machine may be formed into cylinders of predetermined length and diameter, irrespective of variation in the rate of extrusion or the thickness of the extruded cord.

According to the present invention a length of plastic material is extruded slightly exceeding both in length and diameter the dimensions of the required cylinder, the extruded length is sheared, preferably simultaneously in two places at a suitable distance apart, the sheared off length is rolled between a revolving drum and a fixed shield approximately concentric with the drum and at a distance therefrom dependent on the diameter of the required cylinder, and the rolled out cylinder is sheared to the required length.

According to the preferred form of the present invention a length of plastic material which is slightly greater than the desired length is extruded from any suitable form of extruding machine across a shelf and the extruded length is simultaneously sheared in two places at a predetermined distance apart from one another.

The diameter of the extruded material at this stage is arranged to be slightly greater than the desired final diameter.

The moving knives may be arranged to work as described in said United States application Serial No. 738,887, (now U. S. Patent 2,082,833) or may be affixed to a revolving drum hereinafter described.

The action of the cutting knives carries the cut-off portion of the extruded material from the shelf into the gap between a revolving drum and a fixed concave shield held approximately concentric with the drum, and at a distance from the latter dependent on the desired diameter of the finished cylinder.

The distance of the fixed shield from the drum at the point of entry of the cut-off portion may be slightly greater than the desired diameter, in order to facilitate entry of the cut-off portion.

The cut-off portion or cylinder, by the action of the moving drum, is moved along with the drum and rolled between the drum and the fixed shield, being rolled out to the desired diameter in the process, its length being correspondingly increased.

Means are provided to cut off surplus material at each end of the cut-off portion or cylinder so that the final cylinder is of the desired length and diameter.

Figure 2:
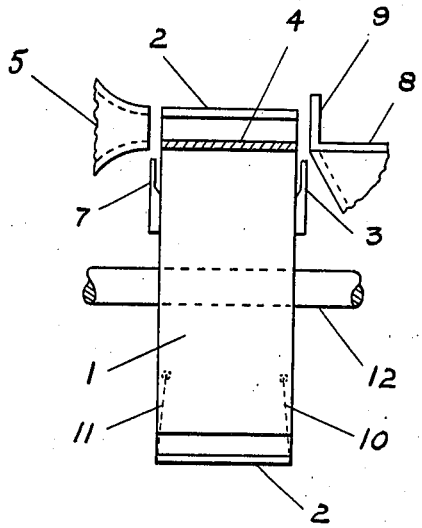
Figure 3:
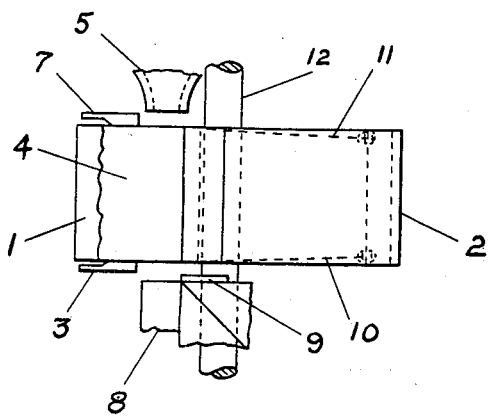

One form of the invention is illustrated in the accompanying drawing, in which Figure 1 is a diagrammatic sectional elevation, Figure 2 is a diagrammatic end elevation, and Figure 3 is a diagrammatic plan view. In this form of the invention the moving knives instead of being arranged as described in co-pending United States application Serial No. 738,887 (now U. S. Patent 2,082,833) are attached one on each side of the revolving drum.

Referring to the drawing, the shaft 12 driven by any convenient mechanical means at a suitable constant speed has attached to it a drum 1 upon which are fixed knives or other shearing devices 3 and 7.

The nozzle of an extruding machine is shown as 5 and pieces of plastic explosive or other plastic material are shown as 6.

A shelf 4 is provided across which the plastic material is extruded from the nozzle 5, the means of supporting the shelf 4 not being shown.

Around the drum 1 for a part of its circumference is fixed a shield or guide 2 which is concentric or nearly concentric with the drum 1.

The distance between the drum 1 and the shield 2 is dependent on the desired diameter of the finished cylinder of plastic material, but that part of the shield nearest to the nozzle 5 may be at a distance from the drum slightly greater than the desired diameter of the finished cylinder in order to facilitate entry of the cylinder of material between the revolving drum 1 and the fixed shield 2.

The shield may be so arranged that its distance from the drum may be increased or decreased within suitable limits dependent upon the diameter of the finished cylinder desired.

Attached to the shield are two wires 10 and 11, the one end of each wire being attached to that portion of the shield which is furthest from the nozzle 5 and the other end of each wire being attached to the shield some distance nearer to the nozzle. The distance between these wires is equal to the desired length of the finished cylinder of plastic material. These wires serve to cut off the surplus length at the ends of the cylinder of plastic material after it has been rolled between the drum 1 and the shield 2.

I show wires as being used for this purpose but stationary or moving knives may be employed.

The platform 8 carries an upright knife 9 so positioned that the cord of plastic material extruded from the nozzle 5 across the shelf 4 passes on to platform 8 and close to the knife 9.

The surface of the drum 1 and the inner surface of the shield 2 may be smooth, or, for some plastic materials, they may be grooved or roughened.

The action of the apparatus is as follows:

A cord of plastic material is extruded from any suitable form of extruding machine through the nozzle 5 across the shelf 4 and on to the platform 8.

The rotation of the shaft 12, carrying the drum 1 and the knives 3 and 7, moves these knives through the cord of plastic material. The passage of the knife 7 past the nozzle 5 and of the knife 3 past the stationary knife 9 cuts off a portion of the plastic material and propels this cut-off portion off the shell 4 on to the drum 1. The portion of the extruded material beyond the knife 9 falls down a chute or guide, not shown, which may be a part of the platform 8.

The cut-off portion of plastic material 6 is caused to travel and rotate by the motion of the drum 1 and the friction of the stationary shield 2.

The rolling action reduces the diameter of the cylinder 6 to the desired extent, its length being correspondingly increased.

As the cylinder 6 continues to roll past the wires 10 and 11 its ends are sheared off; the ends fall by gravity and the finished cylinder, of the desired diameter and length is delivered at the end the the shield 2 farthest from the nozzle 5.

Successive lengths of plastic material as they are extruded across shelf 4 on to shelf 8 are cut by the knives 3 and 7 as the drum revolves or several pairs of knives may be affixed to the drum, dependent upon the rate of extrusion and the rate of speed at which it is desired to work the apparatus and supply finished cylinders.

This apparatus is particularly suitable for use with gelatinous or plastic blasting explosive in connection with mechanical wrapping apparatus such as those described in co-pending United States applications Serial Nos. 718,490 and 5,458 which have resulted in U. S. Patents 2,026,532 and 2,092,066, respectively.

When this apparatus is used in conjunction with said wrapping apparatus it is readily synchronised by suitable gears so as to function in co-ordination with the wrapping apparatus and to deliver the finished cylinders at the appropriate times.

As many and varied and apparently widely different embodiments of this invention may be made without departing from the spirit and scope thereof, it is to be understood that I do not limit myself to the specific embodiments thereof, except as defined in the appended claims.

I claim:

1. Apparatus suitable for forming plastic or gelatinous material into cylinders of predetermined length and diameter comprising means for extruding a length of plastic material exceeding both in length and diameter the dimensions of the required cylinder, means for shearing the extruded length, means for rolling the material to desired diameter and including a revolving drum and a fixed shield approximately concentric with the said drum and at a distance therefrom dependent on the diameter of the required cylinder, means for feeding the sheared-off length into the space between the drum and the shields, and means for shearing the length of plastic material to the desired length after rolling.

2. The apparatus of claim 1 in which the first mentioned shearing means are adapted to shear the extruded length of plastic material simultaneously in two positions separated by a distance substantially equal to the desired length.

3. The apparatus of claim 1 in which the first mentioned shearing means comprise cutting members attached to the two edges of the rotating drum.

4. The apparatus of claim 1 in which the second mentioned shearing means comprise a pair of wires affixed to the two edges of the shield.

5. The apparatus of claim 1 in which the first mentioned shearing means comprise cutting members attached to the two edges of the rotating drum, the apparatus also comprising a shelf adapted to receive the extruded material, a platform and a fixed knife attached to the platform at the end of the shelf remote from the extending device, so that the knives attached to the revolving drum operate with the nozzle of the extruding device and with the fixed knife in order to shear a length of the extruded material.

6. The apparatus of claim 1 in which the drum and the shield have adjustable mountings, which permit variations in the distance between them.

7. The apparatus of claim 1 in which that end of the space between the drum and shield adapted to receive the length of plastic material is slightly wider than the remainder of the annular space.

8. The apparatus of claim 1 in which the first mentioned shearing means are adapted simultaneously to propel the sheared-off length into the space between the drum and the shield.

ALBERTUS HENDRIK HAUPT.